UNITED STATES PATENT OFFICE.

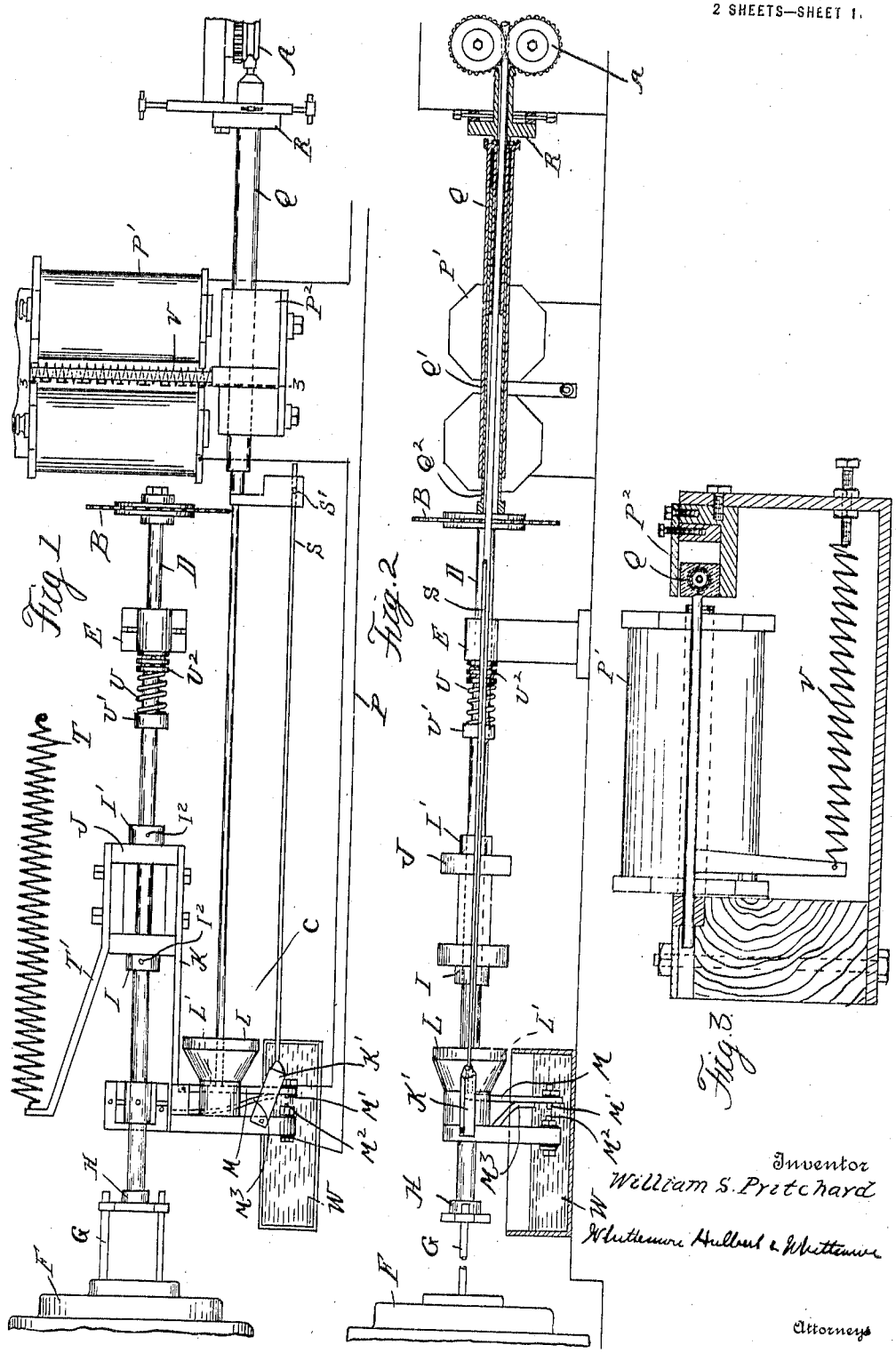

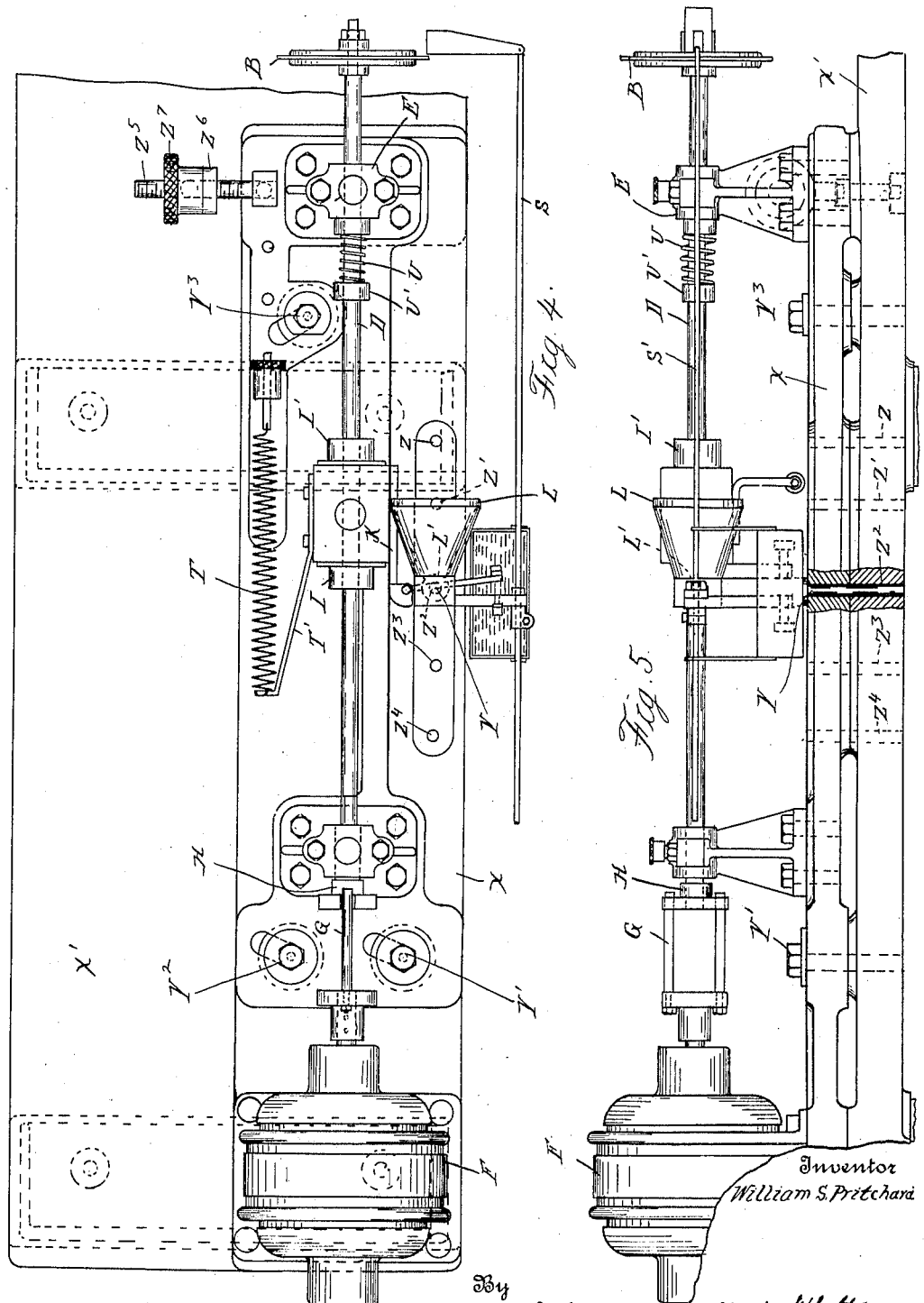

WILLIAM S. PRITCHARD, OF DETROIT, MICHIGAN, ASSIGNOR TO MOTOR PRODUCTS CORPORATION, OF DETROIT, MICHIGAN, A CORPORATION OF MICHIGAN.

TUBE-CUTTING MECHANISM.

1,367,564.  Specification of Letters Patent.  Patented Feb. 8, 1921.

Application filed March 24, 1919. Serial No. 284,743.

*To all whom it may concern:*

Be it known that I, WILLIAM S. PRITCHARD, a citizen of the United States of America, residing at Detroit, in the county of Wayne and State of Michigan, have invented certain new and useful Improvements in Tube-Cutting Mechanism, of which the following is a specification, reference being had therein to the accompanying drawings.

The invention relates to the manufacture of tubing and it is the object of the invention to provide means for successively severing a continuously advancing tube into sections of a predetermined length. The invention is therefore particularly applicable to the method of manufacture in which long strips of metallic ribbon are fed through the tube-forming machine and are continuously advanced during the performance of the several operations incident to the completing of the tube.

In the drawings:

Figure 1 is a plan view of the machine;

Fig. 2 is a side elevation thereof;

Fig. 3 is a cross-section on line 3—3 of Fig. 1.

Fig. 4 is a plan view;

Fig. 5 is a side elevation of a slightly modified construction.

A are feed rolls at the delivery end of tube-forming mechanism (not shown), B is a saw for cutting the tube into lengths, and C is an adjustable gage for determining the length of the section to be severed. As the tubing is continuously advancing it is necessary that the severing operation should be performed without interference with such advancement, and also that the sections severed should be of an exactly predetermined length. To accomplish this I have provided means actuated by the advancing end of the tube for moving the severing device at the same speed during the interval in which it is performing its operation.

The severing saw B is mounted upon an arbor D which is slidably mounted in bearings E. F is an electric motor or other rotary driving means for the arbor D which is coupled to the latter by a telescopic connection permitting of independent longitudinal movement. As shown, the motor is provided with a pair of arms G projecting therefrom parallel to and on opposite sides of the axis, and these arms G engage bearings on a head H which is mounted on the arbor D. The arbor is moved in these bearings by the pressure of the advancing tube and the mechanism for accomplishing this result is as follows: I and I' are collars on the arbor D, between which is arranged a sleeve J. Secured to this sleeve is an arm K which at its outer end carries the gage member C. The latter includes a flaring mouth piece L for receiving the advancing end of the tube and guiding the same against a seat or bearing L' through which motion is communicated to the arm K, sleeve J, collars I I' and arbor D. Thus as soon as the end of the tube contacts with the seat or bearing L' the arbor D and saw B carried thereby will travel at the same speed as the tube, so that the tube may be severed without interfering with its advancement.

To sever the tube it must be moved laterally into the saw, and as soon as the section is severed the main portion of the tube must be quickly removed from the path of the saw so that it can continue its advancement, while the saw and arbor are returned to their initial position. This lateral movement I preferably accomplish by electromagnetic means, the electric circuit therefor being closed by the pressure of the end of the tube against its seat L'. As shown, the seat L' is formed on a pivoted lever member M which carries an electric contact M' which normally is spaced from a coöperating contact $M^2$. $M^3$ is a spring for normally holding these contacts separated, but of such light tension that the pressure of the tube upon the seat L' will press the contacts together. The contacts M' and $M^2$ when together close an electric circuit P which energizes an electro-magnet P'. This magnet is arranged adjacent to a laterally movable guide tube Q, through which the tubing is delivered from the feed rolls A, and $P^2$ is an armature for the magnet attached to this guide. The guide Q is preferably formed of telescopically engaged tubes Q' and $Q^2$, the former having a pivotal engagement with a stationary tubular guide R at the delivery end of the feed rolls A. The tube $Q^2$ is attached by a rod S to a lateral extension K' of the arm K so that the movement imparted to said arm by the delivered tubing will be communicated to the guide tube $Q^2$. The end of this guide tube $Q^2$ is adjacent to the saw B and as the tube travels with the arbor and saw this relationship will be maintained in all positions of adjustment. At the same time the guide tube Q², as well as the larger guide tube Q' with which it telescopes, will be moved laterally by the armature P² whenever the electro-magnet is energized. This lateral movement is sufficient to draw the tubing delivered from the guide tube into the saw B so as to produce a severance of the tubing.

In operation the parts are normally in the position shown in Fig. 1 where the arbor D is in its retracted position, being yieldably held in this position by a spring T engaging an arm T' on the sleeve J. There is also a resilient bearing formed by a spring U on the arbor bearing against a collar U' at one end and against an anti-friction bearing U² at its opposite end, the latter abutting against the bearing E. Whenever the machine is in operation the formed tubing will be continuously delivered from the rolls A into the laterally movable guide Q, and the forward end of the advancing tubing after passing through this guide will continue until it enters the flaring mouth piece L and engages the seat L'. The first effect of this engagement with the seat is to press the contacts M' and M² together, which closes the electric circuit P, energizes the magnet P' and by attracting the armature P² moves the guide Q laterally. This will draw the portion of the tubing just emerging from the end of the guide tube Q² into the saw B which will quickly sever the same from the following tubing. The operation requires but a brief time interval, but inasmuch as the advancement of the tubing is continuous it is essential that the saw should advance therewith and this is accomplished, as previously described, through the medium of the arm K, sleeve J, collars I and I' and arbor D. Also the rod S being connected to the lateral extension K' of the arm K will be advanced with the saw, maintaining the end of the delivery guide tube Q² in constant relation to the saw while in operation. As soon as the section of the tubing is severed it will be moved out of the path of the following tubing by the rotary movement of the saw, and this relieving pressure on the bearing L' will permit the contacts M' and M² to separate, breaking the electric circuit P and deënergizing the electro-magnet P'. When this occurs, a spring V operating upon the armature of the magnet returns it to its original position, while the spring T operating upon the arm T' will return the arbor, saw and guide tubing Q². Thus, before another length of tubing is advanced to contact with the bearing L' the parts have assumed their initial position. To avoid sparking between the contacts M' and M² when the circuit is opened, the latter are preferably immersed in a bath of oil or other dielectric fluid, as indicated at W.

To set the gage for severing the tubing in accurately predetermined lengths the collars I and I' are adjustably secured upon the arbor D by set-screws I², and whenever it is desired to alter the length of the severed sections these set-screws are loosened and shifted in position. There is also an adjustable connection between the rod S and the guide tube Q² locked by the set-screw S'.

My improved severing mechanism is adapted to operate upon tubing delivered at a relatively high rate of speed. This is broadly due to the fact that the tubing is moved into the saw instead of moving the saw across the tubing. The axis of the saw and arbor is therefore fixed, and as the delivered tubing as well as the tubular guide are both of small dimensions, the inertia factor is slight. The longitudinal movement of the saw and arbor is effected by force transmitted longitudinally of the tubing or in the direction of its greatest strength, so that there is little tendency to bend or buckle under stress. Moreover, as soon as the saw enters upon its cut the advancing tubing in rear of the saw pressing thereagainst will assist in moving the arbor longitudinally until the severing is complete and the saw is retracted by the operation of the spring V. Furthermore, the cutting of the saw is adjacent to the end of the telescopic guide tube which travels with the saw, and therefore the tubing in rear of the saw which is pressing thereagainst is held from lateral deflection by this telescopic guide.

When the machine is in operation it is frequently necessary to sharpen the saws or to replace one saw by another. This would necessitate a change in adjustment to compensate for the changed diameter of the saw. I, therefore, preferably use the modified construction shown in Figs. 4 and 5, in which the arbor D, its motor and associated mechanism are all mounted upon a base, which in turn is adjustably mounted on a sub-base X'. The attachment between the base and sub-base is through the medium of a pivot pin Y, which is located substantially in line with the seat L', and also by bolts Y', Y², Y³ passing through slotted apertures in the upper base X into threaded apertures in the sub-base X'. Thus whenever a saw is exchanged, by loosening the bolts Y', Y², Y³ the base may be swung upon the sub-base so as to move the saw toward or from the work without in any way altering the location of the seat L'.

Where different lengths of tubes are to be cut and it becomes necessary to adjust the position of the seat L' this is provided for by a series of apertures Z, Z', etc., each one of which is adapted to receive the pin Y. The location of these apertures corresponds with standard lengths of tubing, and therefore whenever a different length is required the pin Y may be removed from the aperture with which it is engaged and placed in another aperture and the seat L' adjusted to corresponding position.

To facilitate the adjustment of the sub-base a screw-threaded rod $Z^5$ is attached thereto, which rod passes through an aperture in a bearing $Z^6$ upon the base, while a nut $Z^7$ serves to adjust said rod in relation to said bearing. The slots for the bolts Y', $Y^2$, $Y^3$ are sufficiently enlarged to compensate for a differential movement when the pin Y is adjusted into different positions.

What I claim as my invention is:—

1. The combination with means for constantly delivering tubing in the direction of its axis, of a laterally movable guide through which the tubing is delivered, a rotary severing device having a fixed axis of rotation, a gage adapted to be set a predetermined distance in advance of said guide, a circuit closer carried by said gage and actuated by the forward end of the advancing tubing, and electro-magnetic means for moving said guide laterally, controlled by said circuit closer.

2. The combination with means for delivering tubing in the direction of the axis thereof, of a laterally movable guide through which said tubing is delivered, a rotary severing device having a fixed axis of rotation and capable of longitudinal adjustment, a gage longitudinally adjustable with said severing device and adapted to be set in relation thereto, a circuit closer carried by said gage and operated by the forward end of the advancing tubing, and electro-magnetic means controlled by said circuit closer for moving said guide laterally across the path of the saw.

3. The combination with means for delivering tubing in the direction of the axis thereof, of a laterally movable guide through which said tubing is delivered, a rotary arbor parallel to the axis of said tubing, a severing cutter mounted on said arbor, a member connected to said arbor to move the same longitudinally, said member having a portion extending into the path of the advancing tubing and set at a predetermined distance from said severing device, a circuit closer carried by said member and actuated by the forward end of the advancing tubing, said member being also actuated by said tubing to move said arbor and severing device longitudinally at the same rate, and electro-magnetic means controlled by said circuit closer for moving said guide laterally to draw said tubing across the path of the saw.

4. The combination with means for delivering tubing in the direction of the axis thereof, of a laterally adjustable guide through which said tubing is delivered, a rotary arbor having a fixed axis parallel to the axis of said tubing, said arbor being longitudinally adjustable, a cutter mounted on said arbor, a member for moving said arbor longitudinally, having a portion extending into the path of said tubing and in predetermined relation to said cutter, a circuit closer carried by said member and actuated by the forward end of said tubing, electro-magnetic means controlled by said circuit closer for moving said guide laterally to draw said tubing across the path of the cutter, and a connection between said guide and arbor for advancing the same together during the severing operation.

5. The combination with means for delivering tubing in the direction of the axis thereof, of a rotary arbor arranged parallel to the axis of said tubing and longitudinally adjustable, a cutter mounted on said arbor, a member for moving said arbor longitudinally, extending into the path of said tubing and adapted to be advanced thereby, a circuit closer carried by said member, actuated by the forward end of the tubing, a telescopic guide for said tubing having its delivery end adjacent to said cutter, a connection between said telescopic guide and said arbor for causing the two to advance together, and electro-magnetic means controlled by said circuit closer for moving said guide laterally to draw said tubing across the path of the cutter.

6. The combination with means for delivering tubing in the direction of the axis thereof, of a rotary arbor arranged parallel to the axis of said tubing and longitudinally adjustable, a cutter mounted on said arbor, a member for moving said arbor longitudinally, extending into the path of said tubing and adapted to be advanced thereby, a circuit closer carried by said member actuated by the forward end of the tubing, a telescopic guide for said tubing having its delivery end adjacent to said cutter, a connection between said telescopic guide and said arbor for causing the two to advance together, electro-magnetic means controlled by said circuit closer for moving said guide laterally to draw said tubing across the path of the cutter, a base on which said arbor and circuit closer are mounted, adjustable about a center in proximity to said circuit closer to adjust the saw in relation to the work without altering the position of said circuit closer.

7. The combination with means for constantly delivering tubing in the direction of its axis, of a laterally movable guide through which the tubing is delivered, a rotary severing device having a fixed axis of rotation and capable of longitudinal adjustment, a gage longitudinally adjustable with said severing device and adapted to be set in relation thereto, said gage being in the path of the advancing tubing and actuated thereby, a circuit closer carried by said gage, electromagnetic means controlled by said circuit closer for moving said guide laterally across the path of the saw, a base on which the rotary severing device and gage are mounted, a sub-base supporting said base, and means for adjusting said base upon said sub-base to move said severing device laterally in relation to the work, said adjustment being about a fixed point in substantial vertical alinement with said gage.

8. The combination with means for delivering tubing in the direction of the axis thereof, of severing means for said tubing movable therewith and actuated thereby, a gage adjustable in relation to said severing device, a base on which said severing device and gage are mounted, a sub-base on which said base is adjustable, a pivotal connection between said base and sub-base adjustable correspondingly to the adjustment of said gage to maintain a fixed relation thereto, and means for adjusting said sub-base on said base to move the severing means laterally in relation to the work.

9. The combination with means for constantly delivering tubing in the direction of its axis, of a laterally movable guide through which the tubing is delivered, a rotary severing device for the tubing having a fixed axis of rotation, and means actuated by the tubing for advancing said severing device therewith.

10. The combination with means for constantly delivering tubing in the direction of its axis, of a laterally movable guide through which the tubing is delivered, a rotary severing device for the tubing having a fixed axis of rotation, and means controlled by the tubing for moving said guide laterally.

11. The combination with means for constantly delivering tubing in the direction of its axis, of a severing device for the tubing, and means actuated by the tubing for advancing said severing device therewith.

In testimony whereof I affix my signature.

WILLIAM S. PRITCHARD.